April 15, 1958 C. A. JOHANNESEN 2,830,705
MAGNETIC TRAP
Filed Aug. 9, 1954 2 Sheets-Sheet 1
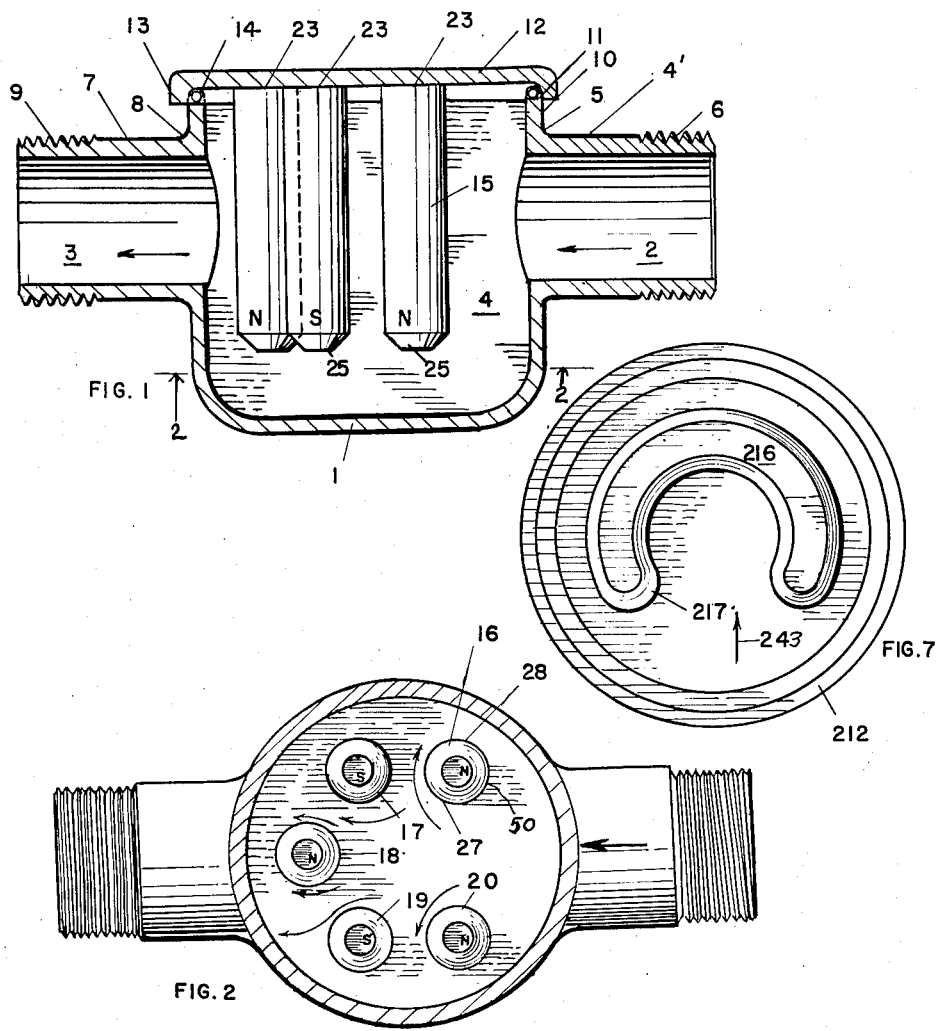
INVENTOR.
CONRAD A. JOHANNESEN
BY
Charles L. Lovercheck
atty April 15, 1958     C. A. JOHANNESEN     2,830,705
MAGNETIC TRAP
Filed Aug. 9, 1954     2 Sheets-Sheet 2
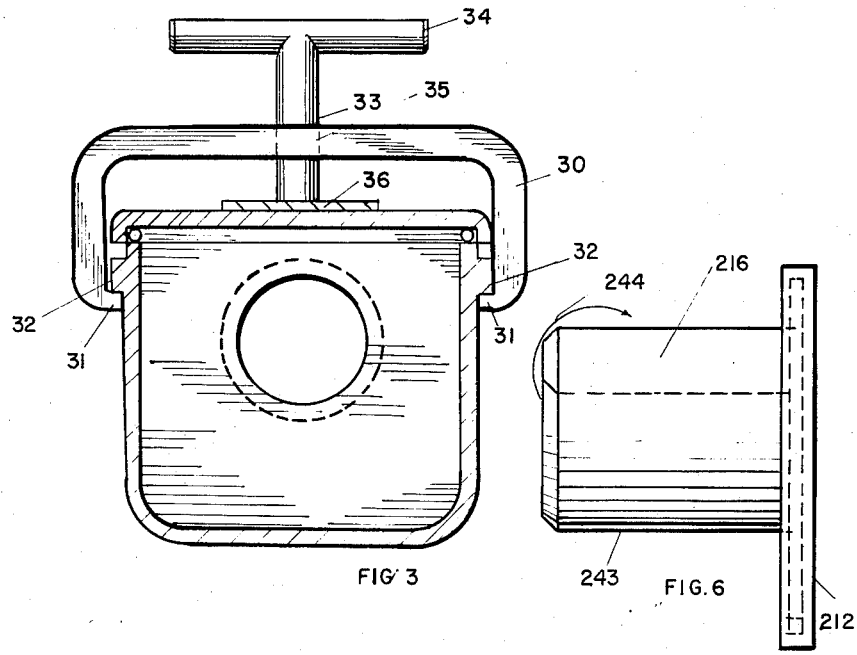
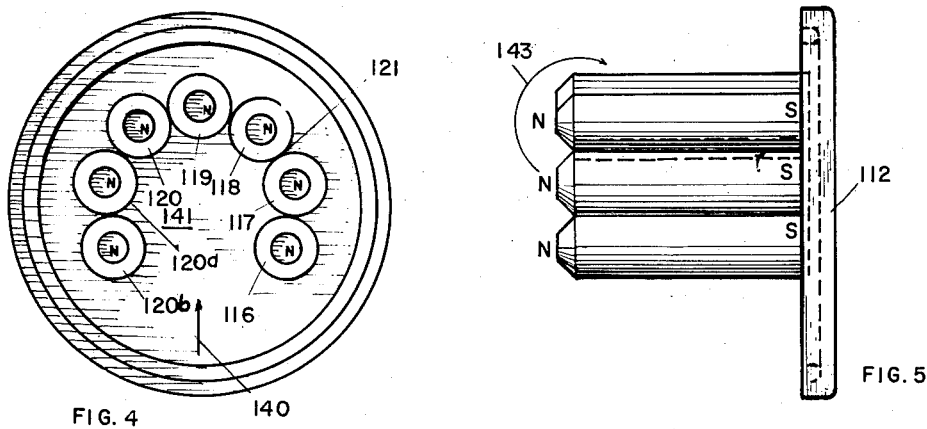
INVENTOR.
CONRAD A. JOHANNESEN
BY
Charles L. Lovercheck
atty

United States Patent Office 2,830,705
Patented Apr. 15, 1958

2,830,705

MAGNETIC TRAP

Conrad A. Johannesen, Erie, Pa., assignor to Eriez Manufacturing Co., Erie, Pa., a corporation of Pennsylvania Application August 9, 1954, Serial No. 448,495

2 Claims. (Cl. 210—222)

This invention relates to traps for conduits and more particularly to traps for removing magnetic particles of foreign material from fluids and like materials being conducted through a conduit.

Magnetic traps which were known previously have been very difficult to dismantle for cleaning. Their design was such that they could not withstand medium to high pressures and they largely depended upon extreme magnetic strength to accomplish the removal of tramp iron from liquids from which the tramp iron was to be removed. The trap disclosed herein controls the depth of flow over the magnetic elements and causes the liquid impinging on the elements to change direction, thereby taking advantage of the difference in inertia of the tramp iron and the material conveying it. Incorporated in the trap disclosed herein is a number of magnetic tubes so arranged that the inlet feeds into a solid pocket formed between the magnetic tubes. The function of this pocket is to distribute the material over and through magnetic tube elements. In other words, the area of the inlet is considerably less than the cross section of the body taken at right angles to the inlet. The pocket, therefore, tends to spread the material downward into this body and to cause it to pass in close proximity around through the magnetic tubes, causing the material to flow in relatively thin streams and, therefore, flow quite close to the magnetic element without a total restriction of area or excessive sizes of housing.

When materials are being handled at a relatively high velocity, there is always a tendency for iron which is once caught by the magnetic element of a trap to be washed off of the element. The present tube design makes it possible for the iron to work around on the surface of the element toward the downstream side of the tube and be protected from this washing action. In addition, a pocket at the bottom of the housing is provided which causes the unit to also act to some degree as a gravity trap for non-magnetic material without blocking or covering the magnetic element.

More specifically, it is an object of this invention to provide a magnetic trap which is simple in construction, economical to manufacture, and simple and efficient in use.

Another object of this invention is to provide a trap for removing magnetic particles from fluids and gases wherein the magnetic elements are arranged in a manner to provide a longer effective flow path for the fluid or gas.

A further object of the invention is to take advantage of change of inertia of the material flowing through a trap in order to more efficiently remove magnetic particles therefrom.

A further object of the invention is to provide an arrangement of magnets in a fluid trap wherein magnetic particles trapped on the magnetic element will not be washed off but will work themselves to a position on the element out of the effect of the fluid stream on the particles.

A further object of this invention is to provide a magnetic trap in combination with a gravity trap for removing foreign particles from fluids and gases.

Another object of the invention is to provide a trap which controls the depth of flow of fluid over the magnetic elements thereon and causes the fluid impinging on the elements to change direction, thereby taking advantage of the difference in inertia of the tramp iron and other magnetic material contained therein.

A further object of the invention is to provide a magnetic trap wherein a number of magnetic tubes is so arranged that the inlet to the magnetic separator feeds material into a solid pocket formed between the magnetic tubes.

It is a further object of this invention to provide a magnetic separator having magnetic elements therein arranged to spread the material passing therethrough and to cause it to pass in close proximity to the magnetic elements and, therefore, come into close relation to the magnetic elements and satisfactorily avoid a total restriction of area or excessive size of housing.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 1 is a partial longitudinal cross sectional view of the trap;

Fig. 2 is a cross sectional view of the trap taken on line 2—2 of Fig. 1;

Fig. 3 is a transverse cross sectional view of the trap with the magnetic elements removed from the cover;

Fig. 4 is a bottom view of the top of another embodiment of the trap;

Fig. 5 is a side view of the cover of a trap made in accordance with the embodiment shown in Fig. 4;

Fig. 6 is a side view of still another embodiment of the invention; and

Fig. 7 is a bottom view of the trap cover shown in Fig. 6.

Now with more specific reference to the drawings, Figs. 1, 2 and 3 show an embodiment of the trap wherein a body housing 1 has an inlet 2, an outlet 3, and an enclosure 4 therebetween. The inlet 2 is made up of a tubular inlet member 4' attached to the body 1 at 5 and threaded at 6 to be suitably attached to a conduit. A tubular member 7 is attached to the outlet 3 at 8 and threaded at 9 to receive an outlet conduit pipe. The upper side of a chamber 10 terminates in a surface 11 and the cover 12 has a peripheral flange 13 thereon which is adapted to fit around the outside edge 11. A gasket 14 may be disposed between the cover 12 and the upper surface 11 to form a sealed joint.

Tubular magnets 15, including magnets 16, 17, 18, 19, and 20, are arranged in spaced relation in the housing 1 and are attached to the cover 12 at 23. It will be noted that the magnets 16, 17, 18, 19, and 20 are attached to the cover 12 at 23 by brazing, soldering, or any convenient means. The permanent magnets 15 may conveniently be formed of the well known high coercivity materials containing nickel, aluminum, and cobalt; for example, the material sold under the registered trademark "Alnico." The lower ends of the magnets 15 are tapered at 25. It will be noted from an inspection of Fig. 2 that the magnets 15 are arranged so that the fluid enters the chamber inlet 2 and flows outward between the magnets 16, 17, 18, 19, and 20 and some of the fluid may even flow down around the lower tapered ends 25. In this manner, the fluid flowing through the housing 1 passes a large amount of surface of magnet and, therefore, is dispersed around the magnets in a relatively thin stream. This arrangement, therefore, controls the thickness of flow of material and the magnetic particles suspended in the fluid will be attracted to the magnets 15 and adhere thereto. It will also be seen that magnetic particles which are attached to the upstream side of the magnets 15 may be urged around the surface of the magnets 15 at 50 to the side 28 where they will be out of the path of flow of fluid past the magnets 15 and will, therefore, be less susceptible to be washed off of the magnets.

The cover 12 supporting the magnets 15 may be held in place by means of a clamp such as clamp 30 which has the inwardly curved ends 31 adapted to engage the underside of the ears 32 on the housing 1. The handle 33 having the hand engaging portion 34 may be threadably engaged in the hole 35 in the clamp 30 and it may engage a reinforcing plate 36 on the cover 12 or it may be attached to the plate 36 to rotate therewith in a conventional manner. In Fig. 3, the housing 1 is shown in cross section for better illustration.

Figs. 4 and 5 disclose another embodiment of the invention wherein a cover 112 similar to cover 12 in Figs. 1, 2, and 3 is provided having the magnets 116, 117, 118, 119, 120, 120a, and 120b attached thereto in abutting relation with their adjacent abutting edges. For example, the edges 121 of the magnets 117 and 118 are actually in contact and brazed together. Therefore, fluid flowing into the trap in the direction of the arrow 140 will flow into the area 141 between the magnets and then down and out and over the edge thereof in the direction of the arrow 143 and outward on each side therefrom, thereby exposing the fluid to a large area of magnetic elements. This arrangement of magnets has advantage over the embodiments shown in Figs. 1, 2, and 3 for some application.

The embodiment of the invention shown in Figs. 6 and 7 discloses a cover 212 similar to cover 12 in Fig. 1 having a magnetic element in the form of the periphery of the circumference of a circle at 216 and having a non-magnetic shield 217 disposed around the magnets. Therefore, the flow of fluid is very much like the flow in the embodiment shown in Figs. 4 and 5 and is in the direction of the arrows 243 and 244 whereby the fluid is exposed to a large area of magnetic surface which passes through the device.

In the embodiment of the invention shown in Figs. 1, 2, and 3, the pole of part of the magnets will be arranged in the form shown; that is, the North and South poles of the corresponding ends of the magnets will be alternated as indicated by N and S in Figs. 1 and 2. In the embodiments of the invention shown in Figs. 4 and 5 and 6 and 7, the corresponding ends of the magnets will have similar poles in order that the magnetic fields of the magnets may be disposed in such a manner as to subject the fluid flowing through the separator to a maximum field strength.

In the foregoing specification, the invention has been set forth in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A trap for fluid lines comprising a housing with an inlet and an outlet therefrom, said housing comprising a cup shaped body member open at the top and having a groove in the upper edge thereof, a non-magnetic cover member adapted to rest on said upper edge with a sealing member in said groove therebetween, and permanent bar magnets having unlike poles adjacent and having their upper ends attached to said non-magnetic cover with non-magnetic spaces between the upper ends of said magnets, said magnets extending downwardly into said body member between said inlet and said outlet, said magnets being attached to said cover member in a pattern conforming substantially to the arc of a circle with the concave side of said arc facing said inlet to said trap, substantially the entire length of said magnets being disposed in liquid adapted to flow through said trap whereby magnetic fields at both ends of said magnets are adapted to attract magnetic material from liquid adapted to flow through said trap.

2. A trap for fluid lines comprising a housing with an inlet and an outlet therefrom, one side of said housing being made of non-magnetic material and having a plurality of elongated permanent magnets each having one end thereof attached thereto with non-magnetic spaces between said ends with their elongated axes in generally parallel relation, each said magnet having unlike poles adjacent the pole of an adjacent magnet, and fluid flowing from said inlet to said outlet passing adjacent said magnets, said elongated magnets being arranged in spaced relation to each other, said magnets being on said side of said trap generally in the form of an arc of a circle, the concave side of the circle opening toward said inlet to said trap.

References Cited in the file of this patent
UNITED STATES PATENTS

| | | |
|---|---|---|
| 1,425,366 | Chapman | Aug. 8, 1922 |
| 1,745,248 | De Guenther | Jan. 28, 1930 |
| 1,806,001 | Simms | May 19, 1931 |
| 2,014,800 | De Guenther | Sept. 17, 1935 |

FOREIGN PATENTS

| | | |
|---|---|---|
| 589,387 | Great Britain | June 19, 1947 |